(12) United States Patent  (10) Patent No.: US 7,336,380 B2
Eisele  (45) Date of Patent: Feb. 26, 2008

(54) RASTER GENERATION SYSTEM AND METHOD OF PROCESSING RASTER DATA

(75) Inventor: Peter Eisele, Östringen (DE)

(73) Assignee: Heidelberger Druckmaschinen AG, Munich (DE)

( * ) Notice: Subject to any disclaimer, the term of this patent is extended or adjusted under 35 U.S.C. 154(b) by 834 days.

(21) Appl. No.: 10/075,670

(22) Filed: Feb. 13, 2002

(65) Prior Publication Data

US 2002/0109869 A1   Aug. 15, 2002

Related U.S. Application Data

(60) Provisional application No. 60/270,685, filed on Feb. 22, 2001.

(30) Foreign Application Priority Data

Feb. 13, 2001   (DE)   ............................... 101 07 047

(51) Int. Cl.
  *G06F 3/12*   (2006.01)
  *G06K 15/00*   (2006.01)
(52) U.S. Cl. ..................................... 358/1.15; 358/1.16
(58) Field of Classification Search ............... 358/1.16, 358/1.15, 1.18, 1.13, 1.14, 1.17, 1.1, 1.6, 358/1.9, 1.11, 1.2, 407, 468, 404, 444; 347/1, 347/2, 3, 5; 399/1
  See application file for complete search history.

(56) References Cited

U.S. PATENT DOCUMENTS 4,491,836 A * 1/1985 Collmeyer et al. ......... 345/441
4,694,405 A    9/1987 Bradbury et al. ........... 358/1.11
5,858,589 A *  1/1999 Govaert et al. .............. 430/30
6,009,245 A   12/1999 Kato et al. .................. 358/1.17
6,049,390 A *  4/2000 Notredame et al. ........ 358/1.15
2001/0022815 A1* 9/2001 Agarwal ................ 375/240.16

FOREIGN PATENT DOCUMENTS

| DE | 195 06 425 A1 | 8/1996 |
|---|---|---|
| EP | 0 153 877 B1 | 9/1985 |
| EP | 0 871 137 A1 | 10/1998 |
| JP | 10-312254 | 11/1998 |

OTHER PUBLICATIONS

Gerd Goldman: "Das Druckerbuch" [the printer's book], Océ Printing Systems, Poing, ed. 4c, Oct. 1999, pp. 10-1-10-10.

* cited by examiner

*Primary Examiner*—Dov Popovici
(74) *Attorney, Agent, or Firm*—Laurence A. Greenberg; Werner H. Stemer; Ralph E. Locher

(57) ABSTRACT

A raster generation system for a printing machine with an image-setting unit in which the system has at least one raster processor for generating raster data from raw image data, and a memory for storing the raster data. In order to have a raster generation system with a high operating speed in spite of the simple components that are used, the memory for storing the raster data is formed by a raster memory with random access, and the raster processor stores the raster data column by column in the raster memory.

9 Claims, 3 Drawing Sheets

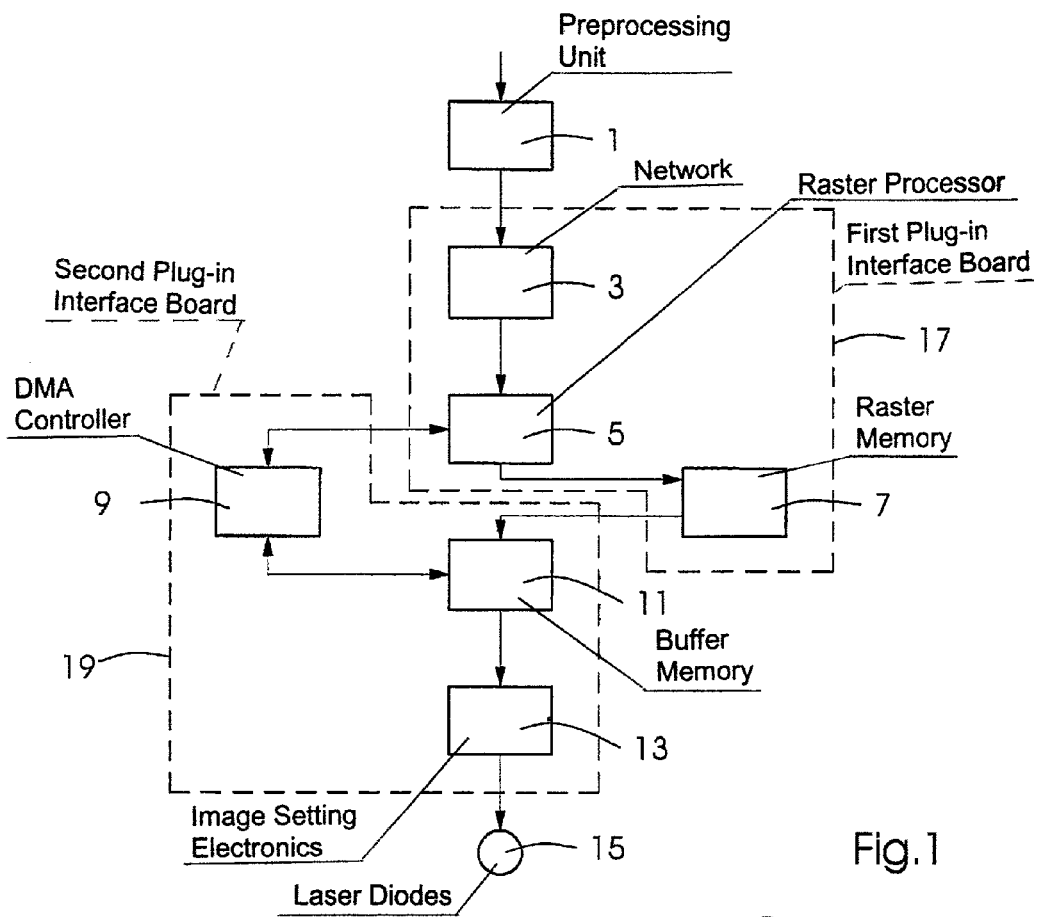
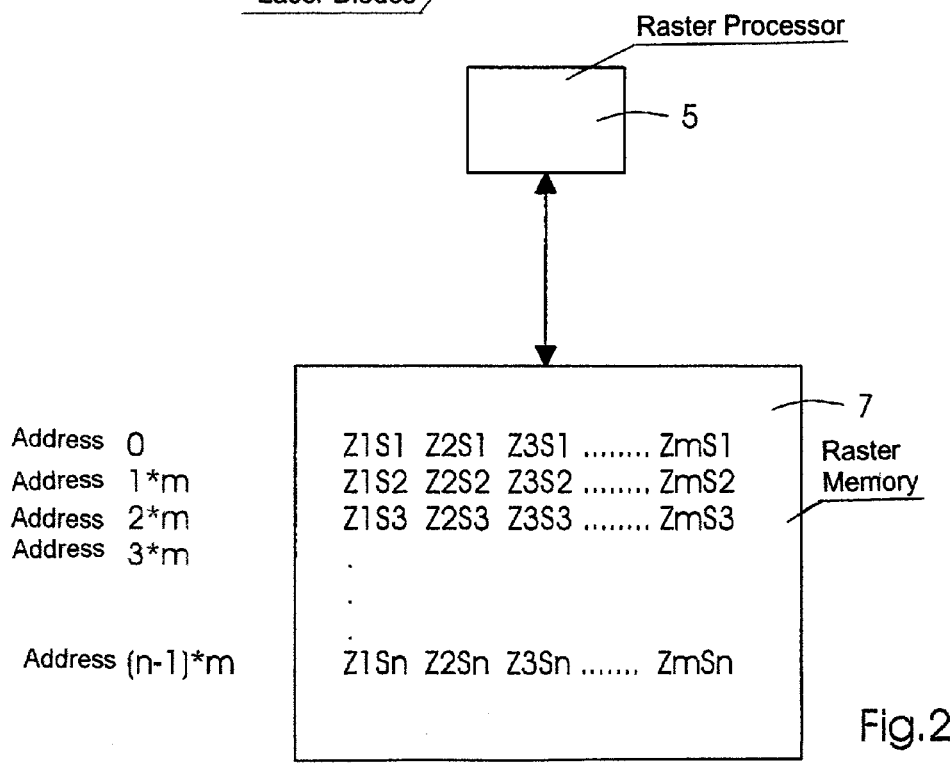

RASTER GENERATION SYSTEM AND METHOD OF PROCESSING RASTER DATA

CROSS-REFERENCE TO RELATED APPLICATION

This application claims the benefit of U.S. Provisional Application No. 60/270,685, filed Feb. 22, 2001.

BACKGROUND OF THE INVENTION

Field of Invention

The present invention relates to a raster generation system for a printing machine with an image-setting unit in which the system has a memory for storing raster data and at least one raster processor for generating the raster data from raw image data. The invention also relates to a corresponding method of processing raster data.

An arrangement of this generic type is disclosed, for example, in Published German Patent Application DE 195 06 425. The raster data are generated on a raster data generator (RIP), are coupled to the printing machine via a network or with a raster processor, and are either fed directly to the image-setting unit via the network or are copied to a mass memory in the printing machine (download) and further processed locally. The raster data are generated from raw data and are written to a mass memory that can be sequentially accessed. The action of reading the raster data back for use in the image-setting unit can therefore also be carried out only sequentially. The raster storage, the transfer and the preparation of the raster data for output to the image-setting electronics require large and fast media and high computing power to reliably provide the data at the necessary speed. The previously known solutions are therefore complicated.

The mass storage devices used are, for example, RAID (Redundant Array of Inexpensive Disks) controllers, which operate a number of fast hard disks in parallel, and therefore, improve the throughput of data while storing and reading the raster data. In this case, processing of the raster data can only begin after the storage and the transfer have been carried out. The raster data are generated line by line and are written to the mass memory line by line, and before the image-setting operation, are read out again column by column or in the FastScan direction, since the known image-setting systems operate, without exception, with column orientation. In this case, the action of reading out lasts significantly longer than writing the data line by line, since the read pointer of the storage medium has to be repositioned continually. The sequential access to the raster memory therefore, prevents the immediate conversion of the raster data into a format suitable for the image-setting electronics.

Another disadvantageous factor in the prior art is the fact that the bandwidth of the network that is used to transfer the data transfer influences the time that is needed to transport the data to the location at which the processing is carried out. Fast networks for transferring the data are expensive, however, and special cabling is required.

Another disadvantageous factor in the prior art is that the interface between the raster data generator (RIP) and the image-setting unit depends to a great extent on its mode of operation. It is known to use software to prepare the raster data in the physical, column-oriented format that is needed by the image-setting electronics. According to this method, the software writes the raster data directly into an output module (FIFO) in order to output the raster data to the image-setting electronics. The software has to carry out this process for each output channel of the image-setting unit, until the image-setting operation has been completed. For this purpose, the software has to resort the raster data, as described above, in order to obtain the sequence of the data required by the image-setting electronics. This sorting is complicated, and in particular, depends on the number of output channels (e.g. laser diodes) used, and also on the physical movement of the channels or of the image-setting head. In addition, during the image-setting process, the CPU (Central Processing Unit) of the raster processor responsible for the data transfer is utilized to a very great extent because of the high data throughput, the continual calculation of the position of the next item of data and the monitoring of the buffer status. In spite of the great speed, the CPU can only be used to a limited extent for other tasks that run in parallel. In addition, the output buffers (FIFO) must be sufficiently large to make it possible to avoid data gaps during the data transfer.

In addition, Issued European Patent EP 0 566 696 B1 discloses an apparatus for image generation in which the printing area is arranged on a rotatable cylinder. First, image information in digital form is transferred to the computer of the apparatus via a magnetic disk, for example, and the computer passes the image information to the downstream control unit. In order to be able to change the circumferential spacing between successive printed dots on the printing area, correction data for the raster data are stored in a RAM (Random Access Memory).

SUMMARY OF THE INVENTION

It is accordingly an object of the invention to provide a raster generation system for a printing machine with an image-setting unit and a method of processing raster data for an image-setting unit of a printing machine which overcomes the above-mentioned disadvantages of the prior art apparatus and methods of this general type.

In particular, it is an object of the invention to provide a generic raster generation system that uses simple components to achieve a high operating speed.

With the foregoing and other objects in view there is provided, in accordance with the invention, a raster generation system for a printing machine with an image-setting unit. The raster generation system includes at least one raster processor for generating raster data from raw image data, and a memory for storing the raster data. The memory is formed by a raster memory with random access, and the raster processor stores the raster data column by column in the raster memory.

In accordance with an added feature of the invention, the raster memory and the raster processor are disposed on a first plug-in interface board.

In accordance with an additional feature of the invention, there is provided, an image-setting unit, and a DMA controller for controlling transfer of the raster data from the raster memory to the image-setting unit.

In accordance with another feature of the invention, an image-setting unit is provided. A DMA controller is also provided for controlling transfer of the raster data from the raster memory to the image-setting unit.

In accordance with a further feature of the invention, a buffer memory is provided. The DMA controller provides an output, and the buffer memory buffers the output of the DMA controller.

In accordance with a further added feature of the invention, a second plug-in interface board is provided, and the DMA controller and the buffer memory are disposed on the second plug-in interface board.

With the foregoing and other objects in view there is also provided, in accordance with the invention, a method of processing raster data for an image-setting unit of a printing machine. The method includes: generating raster data line by line from raw image data; storing the raster data column by column in a raster memory with random access; and reading out the raster data column by column into an image-setting unit.

In accordance with a further mode of the invention, a DMA controller is used to control the step of reading out the raster data; and the raster data that has been read out is buffered in a buffer memory.

The invention expands on the prior art by providing the capability of storing the generated raster data in a raster memory with random access in such a way that no further data preparation by the image-setting electronics is necessary. The raster data are generated line by line and are stored column by column, already rotated through 90°, in the FastScan format. It is not necessary to position the read/write pointer, since there is random access. The image-setting operation can be carried out immediately after the raster process has been completed, without additionally preparing the data. In this case, it is possible to dispense with mechanically moved parts, such as those that are common when a hard disk is used as a memory, to dispense with expensive special components such as the RAID controller, or to dispense with a very fast network for the data transfer.

The raster generation system can have a DMA controller, which controls the transfer of the raster data from the raster memory to the image-setting unit. Transferring the raster data using the DMA controller instead of using the CPU of the raster processor is accompanied by numerous advantages. First, the CPU of the raster processor is loaded to a low extent during the image-setting process, since no complicated calculations are necessary, and the transfer is carried out in the background by DMA controller, independently of the CPU. In addition, the flexibility of the system is enhanced, since the number of channels of the image-setting unit or the number of laser diodes, and the mode of operation of the image-setting head have only small effects on the image-setting software, or according to the invention, is independent of the process of preparing the raster data in the raster memory. The image-setting electronics can therefore be replaced by a different type without having to change the software. The speed of the DMA-controlled data transfer is higher than in the CPU-controlled transfer, which means that higher data rates can be achieved. The size of the output buffer (FIFO) can be reduced accordingly, as a result of the lower latency times that result.

In order to simplify the raster generation system and to enhance its flexibility further, the raster memory and the raster processor CPU are arranged on a first plug-in interface board, and the DMA controller and the buffer memory are arranged on a second plug-in interface board. It is possible for the two boards to be connected to each other via a standard bus.

Other features which are considered as characteristic for the invention are set forth in the appended claims.

Although the invention is illustrated and described herein as embodied in a raster generation system and method of processing raster data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

FIG. 1 is a block diagram of a raster generation system;

FIG. 2 shows the raster data stored in a RAM raster memory;

DESCRIPTION OF THE PREFERRED EMBODIMENTS

Figure 3:
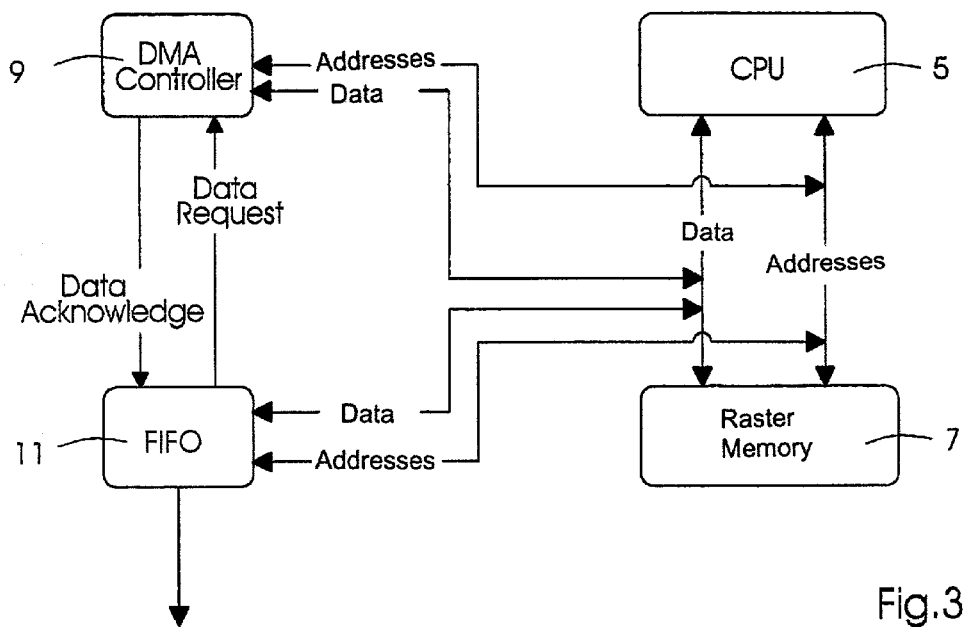
FIG. 3 is a block diagram of the components that are essential to read out the raster data.

Referring now to the figures of the drawing in detail and first, particularly, to FIG. 1 thereof, there is shown a raster generation system that includes a preprocessing unit 1. The preprocessing unit 1 is connected, via a network 3, to a raster processor 5 (RIP) for processing the raster data. A raster memory 7 with random access (RAM) is provided for the raster data, and a (Direct Memory Access) controller 9 is provided for controlling the process of outputting the raster data to the buffer memory 11. The buffer memory 11 is connected to image-setting electronics 13 belonging to an image-setting unit having numerous laser diodes 15. The raster processor 5 with its CPU and the RAM raster memory 7 are arranged on a first plug-in interface board 17 and are connected via a standard bus, for example, a compact PCI (Peripheral Component Interface) or VME (Versa Module Europa) system, to a second plug-in interface board 19. The DMA controller 9, the buffer memory 11 and, if appropriate, the image-setting electronics 13 or laser drive system are arranged on the second plug-in interface board 19.

The preprocessing unit 1 processes raw image data recorded in a current electronic format, such as, for example, PDF (Portable Document Format). The preprocessing unit 1 converts this raw image data that specifies the tonal value of the various printing inks for each point in the image to be printed. The raw image data are broken down into a plurality of part-images, each of which corresponds to one printing ink. In addition, inter alia, information about the inks to be used in the print, the printing material, and the printing plate material are taken into account. The preprocessing unit 1 passes on the data lists precalibrated on the basis of calibration data sets, via a network 3, to one of a plurality of raster processors 5. Each one of the raster processors 5 is permanently associated with the image-setting unit, which includes a large number of laser diodes 15, in order to output the part-image raster data. Alternatively, only a single raster processor 5 can be provided for the image-setting unit 15, but the data transfer is slowed accordingly (illustrated in FIG. 1 for reasons of simplification).

A raster memory 7 having a size of, for example, 200 Mbytes is arranged on the first plug-in board 17, in addition to the CPU or raster processor 5. The raster data is initially generated line by line (Z1 . . . Zm) as raw data, transferred to the preprocessing unit 1 and processed, then further processed by the raster processor 5 to form raster data and finally stored column by column (S1 . . . Sn) in the FastScan format in the raster memory 7 as shown in FIG. 2. As a result of being stored column by column, the column data is already located at successive addresses and can therefore be read out and output very quickly by the image-setting electronics 13 or by external hardware. No further preparation of the raster data by the image-setting electronics 13 is necessary. As a result, the image-setting operation, which assumes that the raster data has been oriented column-by-column, can be carried out immediately after the raster process has been completed. According to the invention the raster data generated is therefore generated directly in the RAM raster memory 7, and is also left there. The step of downloading the raster data from the raster processor 5 to the printing machine having the image-setting unit is dispensed with. The data stream for the diodes 15 or the corresponding buffer memories 11 can be generated directly from the raster memory 7. Since the raster process can directly access all of the raster data already generated, and since this data does not have to be sequentially written to a medium, the generation of any desired output formats is easily possible. The image-setting operation can be carried out directly after the generation of the raster data, and the maximum speed is limited by the image-setting electronics 13 used.

The direct flow of the raster data to the image-setting unit 15, without intermediate stages or conversion by the raster processor (RIP) 5, permits the first plug-in interface board 17 to be used as a universal unit on any desired printing machine. The data format rotated through 90° and the random access to the fast RAM raster memory 7 permit linking with various image-setting units without any complicated changing of the format.

Figure 4:
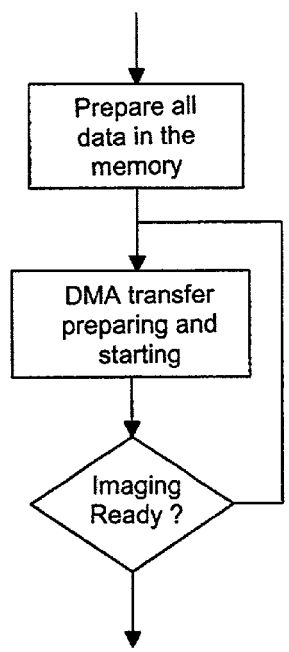
FIG. 4 is a flowchart showing the fundamental sequence of the data transfer.
Figure 5:
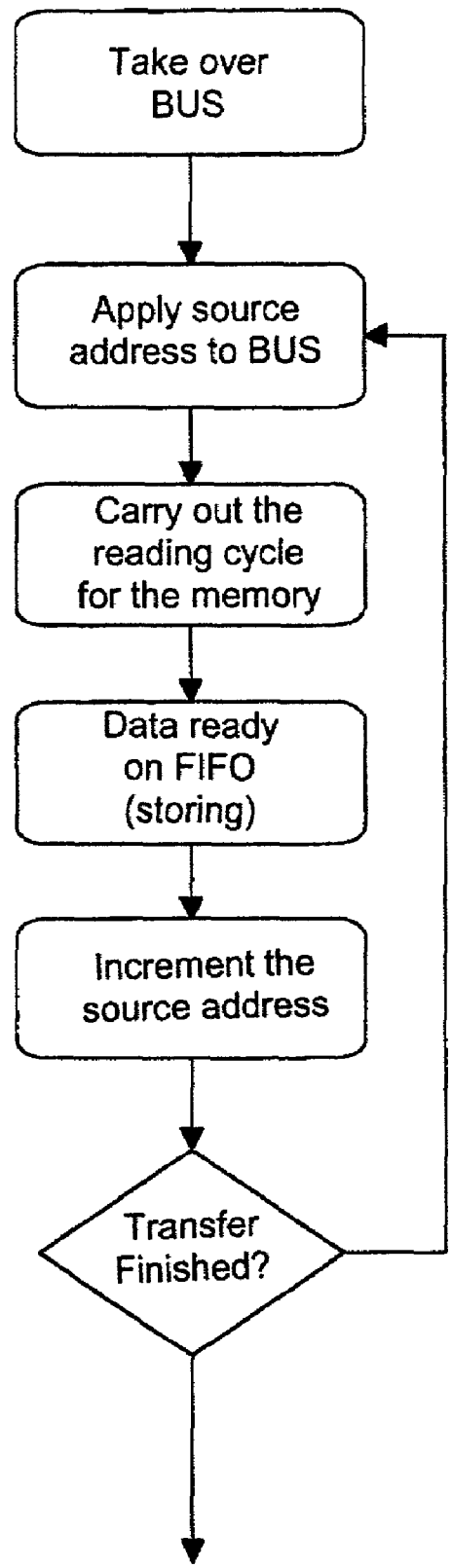
FIG. 5 is a flowchart showing a data transfer sequence that is controlled by a DMA controller.

In the arrangement shown in FIGS. 1 and 3, each channel or each laser diode 15 in the image-setting unit reads the required raster data directly from the RAM raster memory 7 via the buffer memory 11 (FIFO). This is carried out by minimally loading the CPU of the raster processor 5 using a direct memory access that is known per se. The raster data is read from the raster memory 7 using the DMA controller 9 and is written directly into the corresponding buffer memory 11 of a laser diode 15 of the image-setting unit. For this purpose, the raster data for this channel (laser diode 15) must be located at successive addresses in the raster memory 7 (See FIG. 2). The second plug-in board 19 has, for example, two eight-channel DMA controllers 9, sixteen 1 Kbyte*8 FIFOs 11, and an appropriate logic unit for the sequence counters and the image-setting electronics 13. At the start of the image-setting process, the CPU of the raster processor 5 programs the start address of the column data and the size or the quantity of data to be transported (column length) into the registers of the DMA controllers 9, hands over the address buss and the data bus to the DMA controller 9, and starts the sequence. The DMA controller 9 reads all of the column data automatically and transfers the data into the buffer memory 11. The controller 9 generates read/write cycles in order to read the source data from the raster memory 7, and at the end of the memory read operation, sends a signal to the buffer memory 11 to indicate that the next item of data can be accepted. In the process, the DMA controller 9 automatically takes account of the current state or filling level of the buffer memory 11, stops the data transfer briefly when the buffer is full and continues the transfer when the buffer is again able to accept raster data. After the transfer has been completed, the CPU of the raster processor 5 is informed by an interrupt and is able to initiate the next transfer for the next column (See the flowcharts shown in FIGS. 4 and 5). The CPU 5 waits for the end of the data transfer and can carry out other activities during this time. The CPU 5 then initiates the next data or column transfer. As a result, the data transfer is implemented with the maximum efficiency, but with very low loading on the CPU of the raster processor 5.

I claim:

1. A raster generation system for a printing machine with an image-setting unit, comprising:
    at least one raster processor for generating raster data from raw image data; and
    a memory for storing the raster data while the raster data are being generated by the raster processor, said memory formed by a raster memory with random access, said raster memory and said raster processor being arranged on one common board;
    said raster processor storing the raster data column by column in said raster memory while the raster data are being generated.

2. The raster generation system according to claim 1, comprising a first plug-in interface board, said raster memory and said raster processor disposed on said first plug-in interface board.

3. The raster generation system according to claim 2, comprising:
    an image-setting unit; and
    a DMA controller for controlling a transfer of the raster data from said raster memory to said image-setting unit.

4. The raster generation system according to claim 1, comprising:
    an image-setting unit; and
    a DMA controller for controlling a transfer of the raster data from said raster memory to said image-setting unit.

5. The raster generation system according to claim 4, comprising:
    a buffer memory;
    said DMA controller providing an output;
    said buffer memory buffering said output of said DMA controller.

6. The raster generation system according to claim 5, comprising a second plug-in interface board, said DMA controller and said buffer memory disposed on said second plug-in interface board.

7. The raster generation system according to claim 1, wherein the raster data are generated line by line from the raw image data.

8. A method of processing raster data for an image-setting unit of a printing machine, which comprises:
    generating raster data line by line from raw image data;
    storing the raster data column by column in a raster memory with random access while being generated by a raster processor, the raster memory and the raster processor being arranged on one common board; and
    reading out the raster data column by column into an image-setting unit.

9. The method according to claim 8, which comprises:
    using a DMA controller to control the step of reading out the raster data; and
    buffering the raster data that has been read out in a buffer memory.

* * * * *

UNITED STATES PATENT AND TRADEMARK OFFICE
CERTIFICATE OF CORRECTION

PATENT NO. : 7,336,380 B2
APPLICATION NO. : 10/075670
DATED : February 26, 2008
INVENTOR(S) : Peter Eisele It is certified that error appears in the above-identified patent and that said Letters Patent is hereby corrected as shown below:

Title page, Item (73) should read as follows:

Assignee: Heidelberger Druckmaschinen AG, Heidelberg (DE)

Signed and Sealed this
Fifth Day of March, 2013

Teresa Stanek Rea
*Acting Director of the United States Patent and Trademark Office*